(12) United States Patent
Khan

(10) Patent No.: US 12,034,290 B2
(45) Date of Patent: Jul. 9, 2024

(54) SYSTEM AND METHOD FOR REDUCTION OF ARC FLASH ENERGY

(71) Applicant: Md Abid Khan, Porter, TX (US)

(72) Inventor: Md Abid Khan, Porter, TX (US)

( * ) Notice: Subject to any disclaimer, the term of this patent is extended or adjusted under 35 U.S.C. 154(b) by 99 days.

(21) Appl. No.: 17/867,830

(22) Filed: Jul. 19, 2022

(65) Prior Publication Data

US 2024/0030695 A1 Jan. 25, 2024

(51) Int. Cl.
*H02H 1/00* (2006.01)
*H02H 9/08* (2006.01)

(52) U.S. Cl.
CPC ............ *H02H 1/0015* (2013.01); *H02H 9/08* (2013.01)

(58) Field of Classification Search
CPC ....... G01R 13/02; G01R 21/133; H01J 37/32; H01J 37/32532; H02H 1/0015; H02H 3/00; H02B 11/02; H01H 31/12
USPC ..................................................... 361/62–69
See application file for complete search history.

(56) References Cited

U.S. PATENT DOCUMENTS

| | | | |
|---|---|---|---|
| 7,535,686 B2 * | 5/2009 | Valdes | H02H 7/30 361/64 |
| 2007/0242402 A1 * | 10/2007 | Papallo | H02J 13/00028 361/63 |

* cited by examiner

*Primary Examiner* — Danny Nguyen
(74) *Attorney, Agent, or Firm* — Ariel S. Bentolila; Bay Area IP Group, LLC

(57) ABSTRACT

A method for reducing arc flash energy on an electrical system to safe limits, the method including installing an over current relay on a secondary side (480 Volt) of a transformer on the electrical system; wherein the transformer having a primary side and the secondary side; pre-setting a time delay with instanteous settings of the over current relay to a predetermined value; and wherein the predetermined value is configured to be operable for coordinating at least one or more upstream relays and at least one or more downstream breakers. Since the fast overcurrent protection is permanently installed, it is always functional, do not require human interventions and eliminates exposure to human errors.

20 Claims, 9 Drawing Sheets

SYSTEM AND METHOD FOR REDUCTION OF ARC FLASH ENERGY

INCORPORATION BY REFERENCE OF SEQUENCE LISTING PROVIDED AS A TEXT FILE

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to arc flash energy reduction systems on high voltage lines. More particularly, certain embodiments of the invention relate to reduction of arc flash energy on electrical systems to safe limits, for example, when conduct maintenance or to performing trouble-shooting tasks.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon. The general hazards of electricity, for example, electric shock, burns, fire and arc or explosion, are present at high voltage, and the likelihood of serious injury, damage, or death is greatly magnified when working on energized electrical systems. Performing work on an electrical system may only be safe if the system is totally de-energized.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that, in "process" industries where facilities are required to operate continuously for "24/7", a de-energized electrical system may not always be possible for these situations. The electrical system may be continually energized while maintenance or performing trouble-shooting tasks are being conducted. In situations where it may be impractical to de-energize an electrical system, Energy-Reducing Maintenance Switch (ERMS) are employed for arc flash reduction and to reduce the tripping time and subsequent arc flash hazard to personnel working on downstream energized equipment. The device is not intended to be continuously active. The inclusion of the device as part of a system's overall arc flash reduction strategy may provide enhanced personnel protection. Once the work has been completed, the Energy-Reducing Maintenance Switch (ERMS) may be de-activated and the ERMS is switched back to 'OFF' position. The ERMS solution requires human intervention prior and after maintenance activities and may therefore be subjected to human errors. Generally, the ERMS is installed on the upstream higher voltage system breaker which may be remote from the maintenance activity's location and may not be possible to monitor at the maintenance location. The protection coordination may be compromised with the use of the maintenance switch and may cause mis-coordination and/or accidents if the maintenance switch is not turned off after work.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
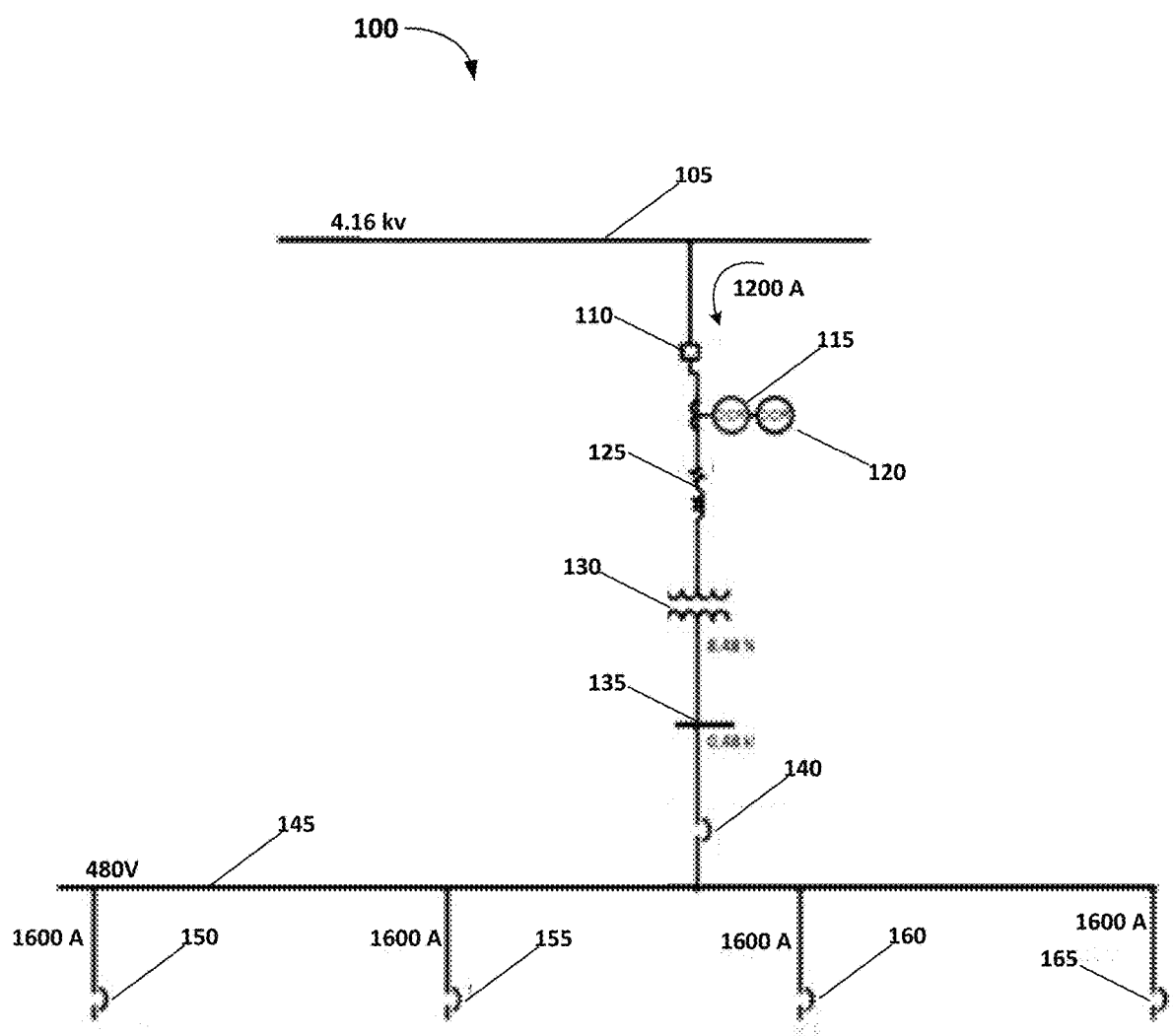
FIG. 1 is an illustration of an exemplary electrical system where 480 Volt incomer breaker does not reduce Arc Flash energy of connection point of secondary side (480 Volt) of transformer and 480 Volt line side breaker, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

An Energy Reducing Maintenance Switch (ERMS) may allow personnel to set a circuit breaker electronic trip unit or protective relay to operate faster should an arc fault occur while the personnel are working within an arc-flash boundary as defined in NFPA 70E-2012, Standard for Electrical Safety Requirements for Employee Workplaces. And then to set the trip unit back to a normal setting after the potentially hazardous work is complete.

An overcurrent relay is a type of protective relay which gets activated when the load current exceeds a pickup/preset value.

A current transformer (CT) is a type of transformer that may be used to reduce or multiply an alternating current (AC). It may produce a current in its secondary which is proportional to the current in its primary.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settled law, as early as 1939, that words of approximation are not indefinite in the claims even when such limits are not defined or specified in the specification.

For example, see *Ex parte Mallory*, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See *Energy Absorption Sys., Inc.* v. *Roadway Safety Servs., Inc.*, Civ. App. 96-1264, slip op. at 10 (Fed. Cir. July 3, 1997) (unpublished) *Hybridtech* v. *Monoclonal Antibodies, Inc.*, 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See *Seattle Box Co.* v. *Industrial Crating & Packing, Inc.*, 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re *Frye*, Appeal No. 2009-006013, 94 USPQ2d 1072, 1077, 2010 WL 889747 (B.P.A.I. 2010) Depending on its usage, the word "substantially" can denote either language of approximation or language of magnitude. *Deering Precision Instruments, L.L.C.* v. *Vector Distribution Sys., Inc.*, 347 F.3d 1314, 1323 (Fed. Cir. 2003) (recognizing the "dual ordinary meaning of the term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognized in case law to have the dual ordinary meaning of connoting a term of approximation or a term of magnitude. See *Dana Corp.* v. *American Axle & Manufacturing, Inc.*, Civ. App. 04-1116, 2004 U.S. App. LEXIS 18265, *13-14 (Fed. Cir. Aug. 27, 2004) (unpublished). The term "substantially" is commonly used by claim drafters to indicate approximation. See *Cordis Corp.* v. *Medtronic AVE Inc.*, 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also *Deering Precision Instruments, LLC* v. *Vector Distribution Sys., Inc.*, 347 F.3d 1314, 1322 (Fed. Cir. 2003); *Epcon Gas Sys., Inc.* v. *Bauer Compressors, Inc.*, 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, *Liquid Dynamics Corp.* v. *Vaughan Co.*, 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In *Cordis Corp.* v. *Medtronic AVE, Inc.*, 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In *Anchor Wall Systems* v. *Rockwood Retaining Walls, Inc.*, 340 F.3d 1298, 1311 (Fed. Cir. 2003)" Id. at 1311. Similarly, the plain language of Claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see *Deering Precision Instruments, L.L.C.* v. *Vector Distrib. Sys., Inc.*, 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., *Epcon Gas Sys., Inc.* v. *Bauer Compressors, Inc.*, 279 F.3d 1022 (Fed. Cir. 2002) (construing the terms "substantially constant" and "substantially below"); *Zodiac Pool Care, Inc.* v. *Hoffinger Indus., Inc.*, 206 F.3d 1408 (Fed. Cir. 2000) (construing the term "substantially inward"); *York Prods., Inc.* v. *Cent. Tractor Farm & Family Ctr.*, 99 F.3d 1568 (Fed. Cir. 1996) (construing the term "substantially the entire height thereof"); *Tex. Instruments Inc.* v. *Cypress Semiconductor Corp.*, 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" may mean "significantly" or "considerably." The term "substantially" may also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see *AK Steel Corp.* v. *Sollac*, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by *Pall Corp.* v. *Micron Separations, Inc.*, 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see *Verve LLC* v. *Crane Cams Inc.*, 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In *Andrew Corp.* v. *Gabriel Elecs. Inc.*, 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in *Ecolab Inc.* v. *Envirochem, Inc.*, 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see *Ecolab Inc.* v. *Envirochem Inc.*, 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see *Pall Corp.* v. *Micron Seps.*, 66 F.3d 1211, 1217, 36 USPQ2d 1225, 1229 (Fed. Cir. 1995); see, e.g., *Andrew Corp.* v. *Gabriel Elecs. Inc.*, 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see *Ex parte Mallory*, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re *Hutchison*, 104 F.2d 829, 42 USPQ 90, 93 (C.C.P.A. 1939) the court said, "It is realized that "substantial distance" is a relative and somewhat indefinite term, or phrase, but terms and phrases of this character are not uncommon in patents in cases where, according to the art involved, the meaning may be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" include the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred, or induced by any pattern(s) of description, embodiments, examples, or referenced prior-art that may (or may not) be provided in the present patent.

References to "end user", or any similar term, as used herein, is generally intended to mean late-stage user(s) as opposed to early-stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of. or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising" And "contain" and variations of them—Such terms are open-ended and mean "including but not limited to". When employed in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component may be said to be configured to (or be operable) for perform(ing) the task even when the specified mechanisms/unit/circuit/component is not currently operational (e.g., is not on). The mechanisms/units/circuits/components used with the "configured to" or "operable for" language include hardware--for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. sctn. 112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

All terms of exemplary language (e.g., including, without limitation, "such as", "like", "for example", "for instance", "similar to", etc.) are not exclusive of any other, potentially, unrelated, types of examples; thus, implicitly mean "by way of example, and not limitation . . . ", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see *Norian Corp.* v *Stryker Corp.,* 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the disclosed and claimed subject matter may include the use of either of the other two terms. Thus, in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Moreover, any claim limitation phrased in functional limitation terms covered by 35 USC § 112(6) (post AIA 112(f)) which has a preamble invoking the closed terms "consisting of," or "consisting essentially of," should be understood to mean that the corresponding structure(s) disclosed herein define the exact metes and bounds of what the so claimed invention embodiment(s) consists of, or consisting essentially of, to the exclusion of any other elements which do not materially affect the intended purpose of the so claimed embodiment(s).

Devices or system modules that are in at least general communication with each other need not be in continuous communication with each other, unless expressly specified otherwise. In addition, devices or system modules that are in at least general communication with each other may communicate directly or indirectly through one or more intermediaries. Moreover, it is understood that any system components described or named in any embodiment or claimed herein may be grouped or sub-grouped (and accordingly implicitly renamed) in any combination or sub-combination as those skilled in the art can imagine as suitable for the particular application, and still be within the scope and spirit of the claimed embodiments of the present invention. For an example of what this means, if the invention was a controller of a motor and a valve and the embodiments and claims articulated those components as being separately grouped and connected, applying the foregoing would mean that such an invention and claims would also implicitly cover the valve being grouped inside the motor and the controller being a remote controller with no direct physical connection to the motor or internalized valve, as such the claimed invention is contemplated to cover all ways of grouping and/or adding of intermediate components or systems that still substantially achieve the intended result of the invention.

A description of an embodiment with several components in communication with each other does not imply that all such components are required. On the contrary a variety of optional components is described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

In some embodiments of the present invention and variations thereof, relate to reduction of arc flash energy on high voltage electrical systems to safe limits. In one embodiment of the present invention, a solution adopted in the industry is the application of Energy Reduction Maintenance Switch (ERMS) in an upstream higher voltage breaker to reduce the energy level on a connection point of secondary side of the transformer (480 Volt) and line side of a 480V breaker. Switching the ERMS "ON" prior to maintenance activities makes the protection faster for a fault in a 480-volt incomer breaker and hence lowers the incident energy. After the maintenance activities are completed, the ERMS is switched back to 'OFF' position to adjust back the protection speed. The application of ERMS may require human intervention before and after maintenance activities and it is therefore subjected to human errors. In addition, the ERMS is installed on the upstream higher voltage system breaker which may be remote from the maintenance activity's location at the 480-volt switchgear and hence impossible to monitor at the maintenance location.

In some embodiment, A recognized engineering challenge is related to personnel protection from fatal arc flash incident energy in the line side of the 480-volt switchgears incomer breakers during maintenance activities. In an electric power system, a switchgear is composed of electrical disconnect switches, fuses or circuit breakers used to control, protect, and isolate electrical equipment. A switchgear is used both to de-energize equipment to allow work to be done and to clear faults downstream. The incident energy is typically high due to slow fault clearance, and it may be higher than the available personnel protective equipment (PPE) ratings. A fault in this section of the switchgear is cleared by breakers or fuses in the upstream higher voltage system (4160 Volt or higher). The current reflection in the higher voltage upstream system for a fault in the 480-volt switchgear is low, the clearance time is slower, and the inversely proportional incident energy is hence higher. The installation of overcurrent protection at 480-volt system upstream of the incomer breaker may operate fast enough to trip the upstream higher voltage breaker when a fault develops at the line side of 480volt incomer breaker. For example, an over current relay has time dial option and based on time dial setting (e.g., 0.5, 1 etc. seconds) it may provide signals to the breaker because of fault to disconnect from the electrical system within the set time in time dial. Therefore, Arc flash energy level reduction as reflected at the line side of 480 volt incomer breaker. Since the fast overcurrent protection is permanently installed, it is always functional, do not require human interventions and eliminates exposure to human errors. The fast overcurrent protection may be installed 480 Volt side at the active maintenance location and its operations may be locally monitored by craftsmen during maintenance activities.

An Arc Flash (AF) energy level on the connection point of secondary side (480 Volt) of transformer and line side of the downstream 480 Volt breaker is always high because of impedance of the transformer. The use of a maintenance switch may compromise a protection coordination. Coordination with other protection devices may be a needed in order to ensure that, when a fault occurs, the smallest section of the circuit is disconnected to minimize disruption of electrical system and if the maintenance switch is not turned off after maintenance activities are completed, it will maximize the disruption of electrical system as there will be no coordination with upstream protection. Installation of over current relay with an instantaneous element & time dial (e.g., instantaneous element in over current relay basically sends signal to breaker to isolate the electrical system without any delay if any fault arises in the electrical system) and CTs close to the secondary side (480 Volt) of the transformer with proper coordination. For example, existing transformer upstream relay, downstream 480 Volt breaker, and 480 Volt feeder breaker may reduce the energy level on the connection point of the secondary side (480 Volt) side of the transformer and 480 Volt line side of the downstream breaker. The overcurrent relay may trip with proper coordination to the upstream breaker of the transformer.

Three CTs may be installed between the 480V transformer secondary and 480 Volt main circuit breaker. The overcurrent relay may be wired from the CTs via CT shorting terminals and be installed on the 480 Volt switchgear. The overcurrent relay may have manual local reset with flag indication. One contact of the overcurrent relay needs to be wired back to 4160V upstream breaker trip circuit, so that in arc flash situation on connection point of secondary side (480 Volt) of transformer and line side (480 Volt) of the breaker, the overcurrent relay may trip the upstream 4160- or 13800-Volt breaker. All necessary testing may be done to confirm desired overcurrent relay operation.

The above relays may require 120 Vac/dc external power to operate. 125 Vdc may be used from the 480 Volt breaker control circuit. In case of fault downstream of connection point of 480 Volt breaker line side and secondary side (480 Volt) of the transformer, the upstream 13800 Volt or 4160 Volt breakers may trip before 480 Volt switchgear main breaker as curves for both overcurrent relays and 480 Volt main breakers are very close to each other. If the 13800 Volt or 4160 Volt upstream breaker may trip before the 480 Volt Switchgear main breaker in case of fault on the 480 Volt main bus, then this mis-coordination may not give greater area outage. This mis-coordination is well acceptable in the industry.

The present invention will now be described in detail with reference to embodiments thereof as illustrated in the accompanying drawings.

FIG. 1 is an illustration of an exemplary electrical system 100 configuration where an approximate 480 Volt incomer breaker 140 does not protect a connection point 135 (e.g., this figure shows an electrical system where there is no overcurrent relay installed) of a secondary side (480 Volt) of transformer 130 and a line side of a 480 Volt breaker 140, in accordance with an embodiment of the present invention. In one embodiment, electrical system 100 may comprise Bus 105 on a primary side of transformer 130 and Bus 145 on a secondary side of transformer 130. Primary side bus 105 of transformer 130 may include but not limited to Unit Svc 6B Supply FBkr5 110, protection relay 115 120, Unit Svc 6B Supply Cb15 125, transformer 130, Bus 8/connection point (480V bus) 135, and Incomer breaker 140. Secondary side bus 145 may include but not limited to U6 BAB Alternate FBkr5 150, Station Aux Brd 6B FBkr5 155, U6 TAB Alternate FBkr5 160, and CB10 165. Feeder breakers 150, 155, 160, and 165 of approximately 480 Volt bus 145 are configured to protect the approximate 480 Volt downstream loads.

Unit Svc 6B Supply FBkr5 110 may include a 4160Volt breaker. Protection relay may comprise Unit Svc 6B Supply 50/S 115 and Unit Svc 6B Supply 51GS 120 which protects line side 105 of 480 Volt incomer breaker 140 and secondary side 145 of transformer 130. Unit Svc 6B Supply 50/S 115 and Unit Svc 6B Supply 51GS 120 may provide the protection relay. Unit Svc 6B Supply Cb15 125 may include a cable. Transformer 130 may include but not limited to an approximately 13.8 kV/0.48 kV or 4.16 kV/0.48 kV transformer. Bus 8/Connection point 135 may include a proximate 480 Volt bus. Breaker 140 protects switchgear 145. Breaker 140 is the part of switchgear 145 which comes with switchgear. Electrical cable has to install to connect transformer 130 and switchgear 145 through breaker 140. Then the connection point 135 is created. Incomer breaker 140 may include a proximate 480 Volts incomer breaker. U6 BAB Alternate FBkr5 150 may include an approximate 480 Volt breaker. Station Aux Brd 6B FBkr5 155 may include an approximate 480 Volt breaker. U6 TAB Alternate FBkr5 160 may include an approximate 480 Volt breaker. CB10 165 may include approximate 480 Volt breaker. Bus 8/connection point 135 (480V bus) may be protected by a proximate 1500 kVA transformer primary protection relay 115 which may have a slow fault clearing time on Bus 8. Arc Flash energy may be very high at the 480V Bus 8 135. Utilizing a maintenance switch (not shown) on the transformer primary protection relay 115 may enable instantaneous setting without delay to reduce the Arc Flash energy level. There may be no coordination on 480 Volt Bus 8 135. Turning on the instantaneous setting of the maintenance switch may not allow transformer 130 to energize because a transformer inrush current may trip the upstream breaker 110 of the transformer primary side relay 115.

Figure 2:
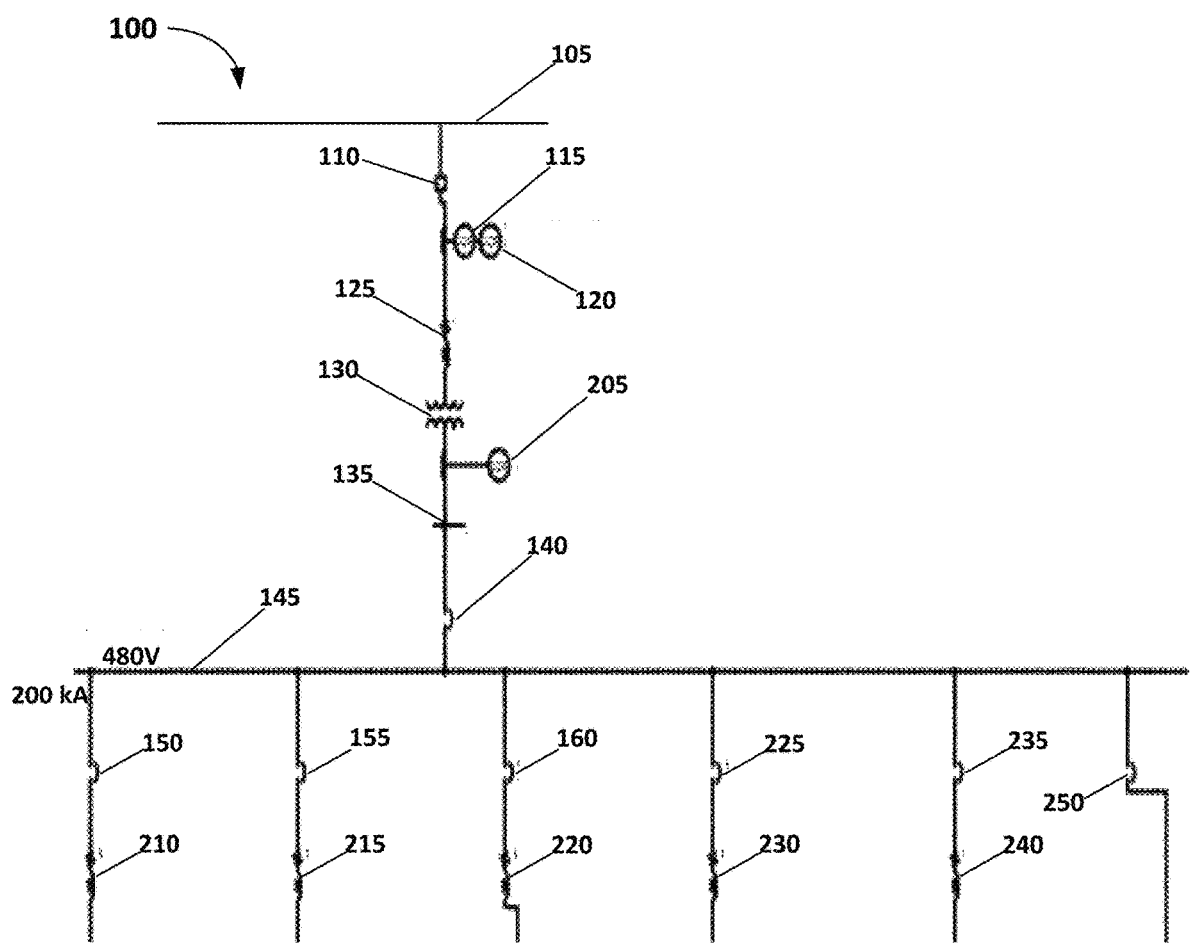
FIG. 2 is an illustration of an exemplary electrical system with installation of over current relays and Current Transformers (CTs) close to the secondary side (480V) of the transformer, in accordance with an embodiment of the present invention.

FIG. 2 is an illustration of an exemplary electrical system 100 with installation of over current relays with Current Transformers (CTs). CT may include a current transformer which is designed to produce an alternating current in its secondary winding that is proportional to the current, that it is measuring in its primary. Over current Relay and CTs are two different equipment. A current relay is an electrically operated switch. The current relay consists of a set of input terminals for a single or multiple control signals, and a set of operating contact which has current ratio of about 2000/5 close to the secondary side (480V) of the transformer, in accordance with an embodiment of the present invention. In an embodiment, FIG. 2 is similar to FIG. 1 except for the installation of an over current relay 205, 480 Volt breakers 225, 235, and 250, and Cables 210, 215, 220, 230, and 240. 480 Volt breakers 225, 235, and 250 are configured to protect the downstream 480 Volt loads. Cables 210, 215, 220, 230, and 240 connect 480 Volts load and 480 Volt breakers 150, 155, 160, 225 and 235. Installation of protection relay 205 close to the secondary side (480 Volt) of transformer 130 may reduce the Arc Flash energy level on Bus 8/connection point 135 of secondary side (480 Volt) of primary side transformer 130 and 480V line side of downstream incomer breaker 140. Arc Flash Energy is the product of fault current, fault clearing time etc. By installing the over current relay close to the secondary side (480 Volt) of transformer 130 which has instanteous settings ON that will clear fault very quickly, eventually reduce the Arc Flash Energy. You cannot set instantaneous settings ON in the upstream relay 115 which protects the transformer 130 as transformer (130) will not energize because of the inrush current of the transformer will activate the relay 115 to send signal to breaker 110 to isolate the transformer from electrical system. For example, over current relay 205 may include an instantaneous element and time dial. Over current relay 205 may be activated as soon as current on Bus 8/connection point 135 gets higher than an over current preset value. A time delay setting of over current relay 205 may be adjusted based on coordination of upstream and downstream (480 Volt side) protection equipment in the electrical system. The time delay setting at different locations in the electrical system may be adjusted so that a breaker closest to the fault is tripped in the shortest time delay and then the other breakers in the direction towards the load are tripped successively with longer time delay. For a definite-time protection, current must exceed the set value and a detected fault must be continuous for a time equal to the time delay setting of over current relay 205. Over current relay 205 may be adjusted to issue a trip output at a definite amount of time after over current relay 205 is activated. Determent of time dial varies with downstream protection devices to get proper coordination.

Figure 3:
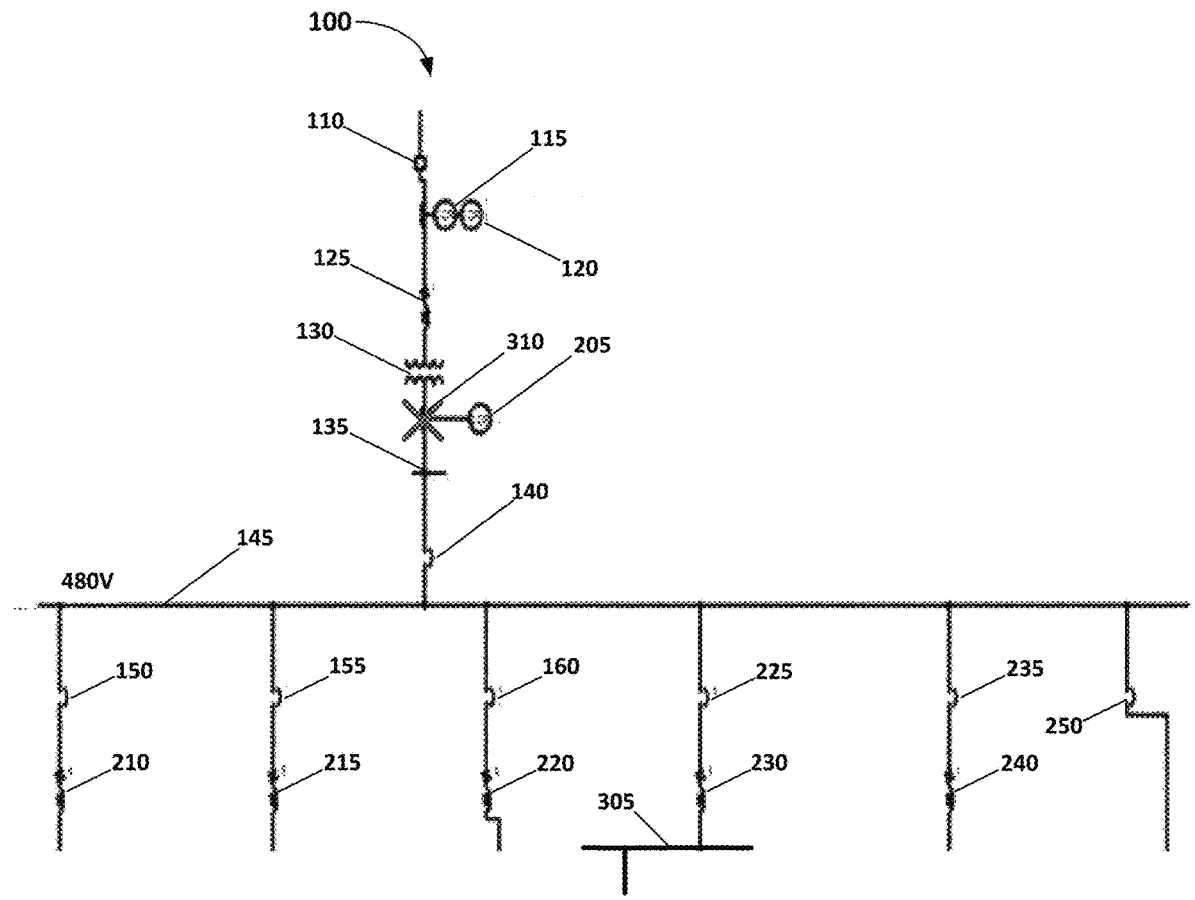
FIG. 3 is an illustration of an exemplary electrical system Arc flash Category Danger at the connection point of secondary side (480 Volt) of the transformer and line side of the 480 Volt breaker without installation of additional relay to the secondary side of the 1500 kVA transformer, in accordance with an embodiment of the present invention.

FIG. 3 is an illustration of an exemplary electrical system 100 without installation of additional relay 205 to the secondary side of the 1500kVA transformer, in accordance with an embodiment of the present invention. FIG. 3 is similar to FIG. 2 except over current relay 205 is not installed. A 480 Volt bus 305 is protected by breaker 225. Arc Flash levels may be dangerous on Bus 8/connection point 135 at the line side of 480 Volt incomer breaker 140 without installation of over current relay 205 (e.g., indicated with a 'cross' 310 over the element) on the secondary side (480 Volt) 145 of transformer 130. An Arc Flash (AF) energy level 58.117 cal/cm2 with fault clearing time more than 2 second on the connection point of secondary side (480 Volt) of transformer 130 and line side of the downstream 480 Volt breaker 140 is always high because of the impedance on the transformer and slow clearing fault from protection relay 115 on the primary side of transformer 130. A maintenance switch may reduce the Arc Flash level but the main difference between installation of maintenance switch and installation of new over current relay close to the secondary side of the transformer is such as that over current relay 205 may automatically control to reduce the Arc Flash level with protection coordination whereas the maintenance switch may be turned ON manually to reduce the Arc Flash level on the line side of incomer 480 Volt breaker and there may be no protection coordination.

Figure 4:
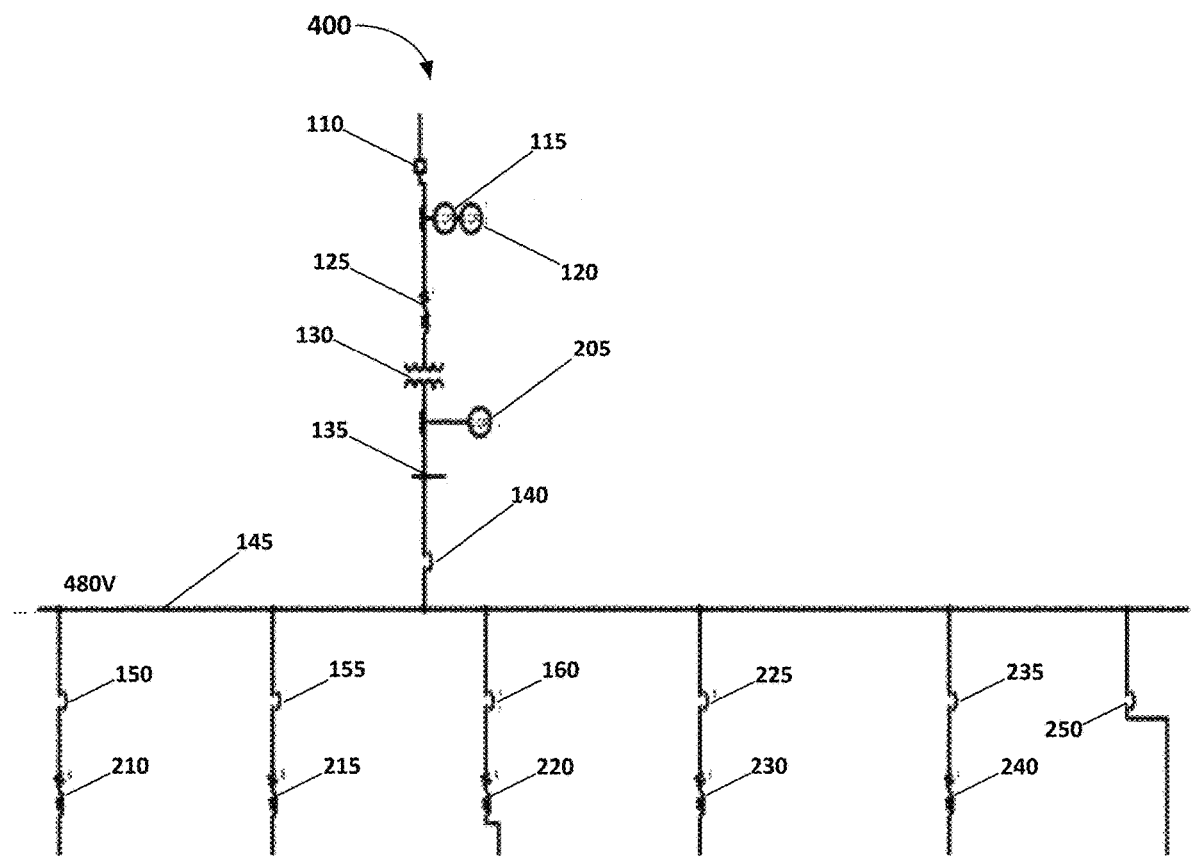
FIG. 4 is an illustration of an exemplary electrical system with Arc Flash Category 3 on the connection point (135) of secondary side (480 Volt) of the transformer and line side of the 480Volt breaker, in accordance with an embodiment of the present invention.

FIG. 4 is an illustration of an exemplary electrical system 100 with Arc Flash Category 3, in accordance with an embodiment of the present invention. In one embodiment, installation of the over current relay 205 on the secondary side of the 1500 kVA transformer 130 may reduce the energy level to 17.177 cal/cm2 on 480 Volt bus 8 135. The National Fire Protection Association (NFPA) uses four Arc Flash PPE Categories to classify ranges of arc flash hazards, and the corresponding requirement for PPE as follows:
Category 1: Minimum Arc Rating 4 cal/cm2
Category 2: Minimum Arc Rating 8 cal/cm2
Category 3: Minimum Arc Rating 25 cal/cm2
Category 4: Minimum Arc Rating 40 cal/cm2
Danger: Over Arc Rating 40 cal/cm2

Figure 5:
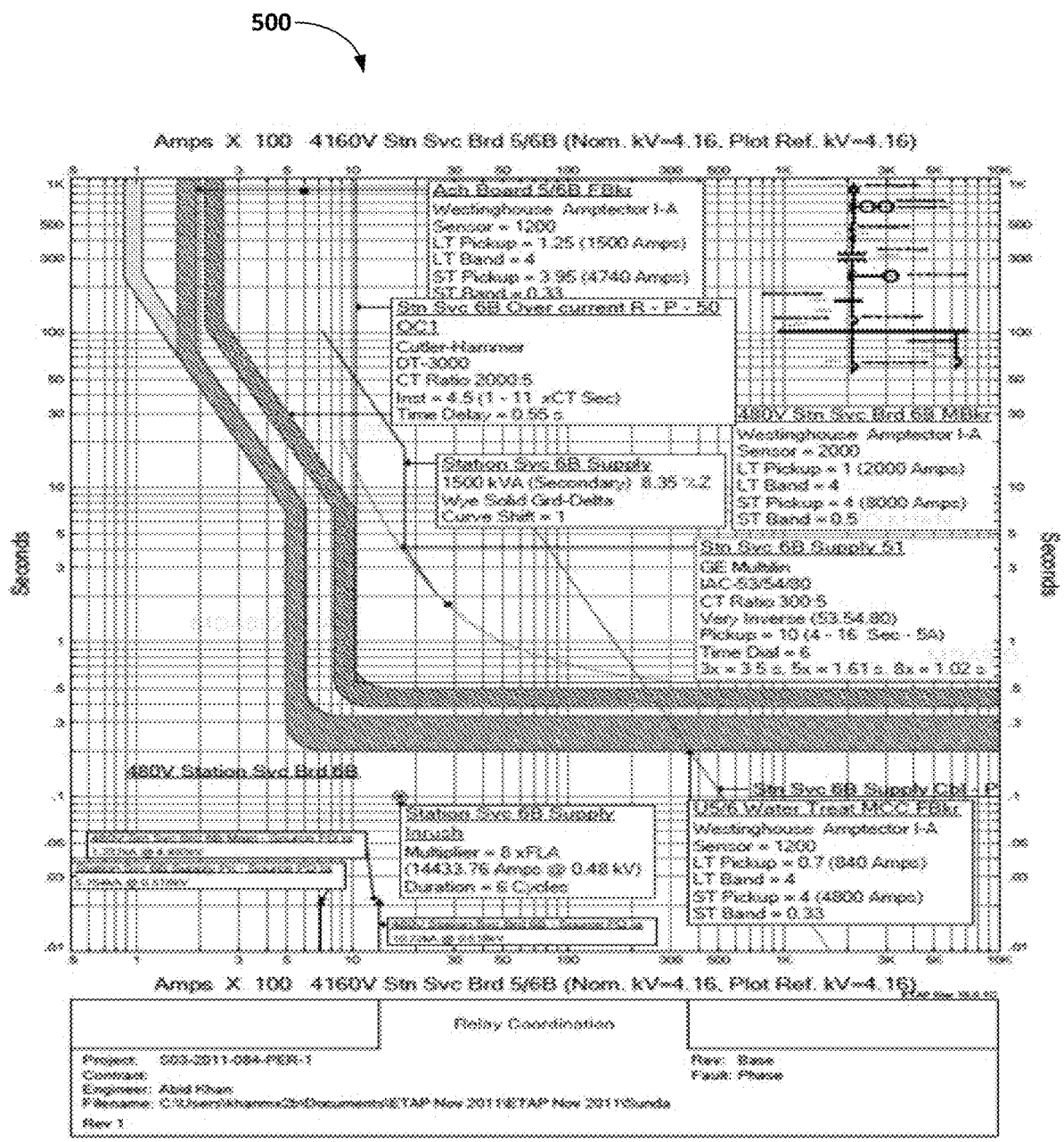
FIG. 5 is an illustration of an exemplary Time Current Curve of an electrical system coordination after installation of over current relay in between secondary side (480 Volt) of the transformer and line side of the 480 Volt breaker, in accordance with an embodiment of the present invention.

FIG. 5 is an illustration of an exemplary Time Current Curve 500 of an electrical system, in accordance with an embodiment of the present invention. The Time Current Curve shows a coordination of overcurrent relay (Stn Svc 6B over current R 205) with 1500 KVA transformer's upstream relay 115 and 480 Volt breaker (480 Volt Stn Svc Brd 6B MBkr 140). Power System coordination by fault insertion (PD sequence of operation) from the ETAP software may be utilized to present how system coordination works with over current relay 205 having instantaneous element and time dial and CTs (current transformer) close to secondary side (480 Volt) 145 of the transformer.

Figure 6:
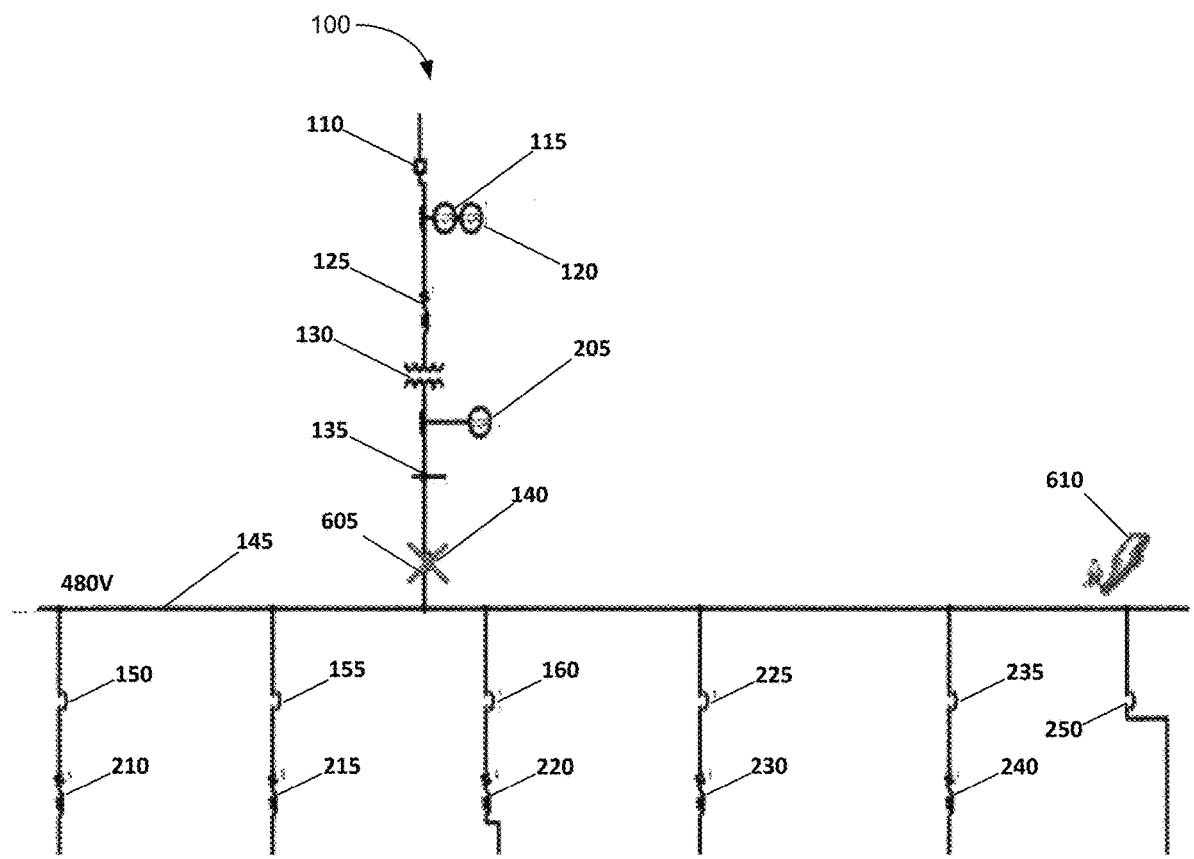
FIG. 6 is an illustration of an exemplary electrical system showing a coordination of 1500 kVA transformer upstream relay and 480 Volt incomer breaker, in accordance with an embodiment of the present invention.

FIG. 6 is an illustration of an exemplary electrical system 100 showing a coordination of 1500 kVA transformer upstream relay 130 and 480 Volt incomer breaker, in accordance with an embodiment of the present invention. The coordination of 1500 kVA transformer upstream relay 115 and 480 Volt incomer breaker 140 may be well coordinated when there is a fault on bus 145, breaker 140 trips first (cross 605) then breaker 110 may trip. Installation of 205 with proper setting doesn't effect on proper protection coordination of the system as additional relay close to the secondary side of the 1500 kVA transformer. Cross 605 on incomer breaker 140 is an indication that incomer breaker 140 will trip if there is any fault 610 on the 480 Volt bus 145. This is a proof of well coordination between 480 Volt breaker 140 with upstream relay 115 with activation of new overcurrent relay 205. Fault sign 610 is an indication 480V bus 145 is faulted based on the ETAP software. The ETAP software is designed to provide option to develop whole existing or new electrical system to analyze electrical systems as per their requirements. Any equipment may be manually selected from the developed electrical system and make fault then the ETAP software may simulate which protection equipment will trip first (e.g., by indicating green cross on the protection equipment) to isolate from electrical system. As initially described when developing whole existing or new electrical system in the ETAP software, then any electrical equipment may be manually selectable and to make the selected electrical equipment fault and check the protection coordination. The ETAP software may be utilized to develop whole existing electrical system then fault sign 610 indicator may be selected from the software. Fault sign 610 indicator may be placed on bus 145 manually from the develop electrical system in the software which make bus 145 fault so that software will simulate which protection equipment will trip first by indicating green cross 605 on breaker 140 (primary protection of bus 145) to isolate from the electrical system. Breaker 140 may trip first if there is any fault on bus 145.

Figure 7:
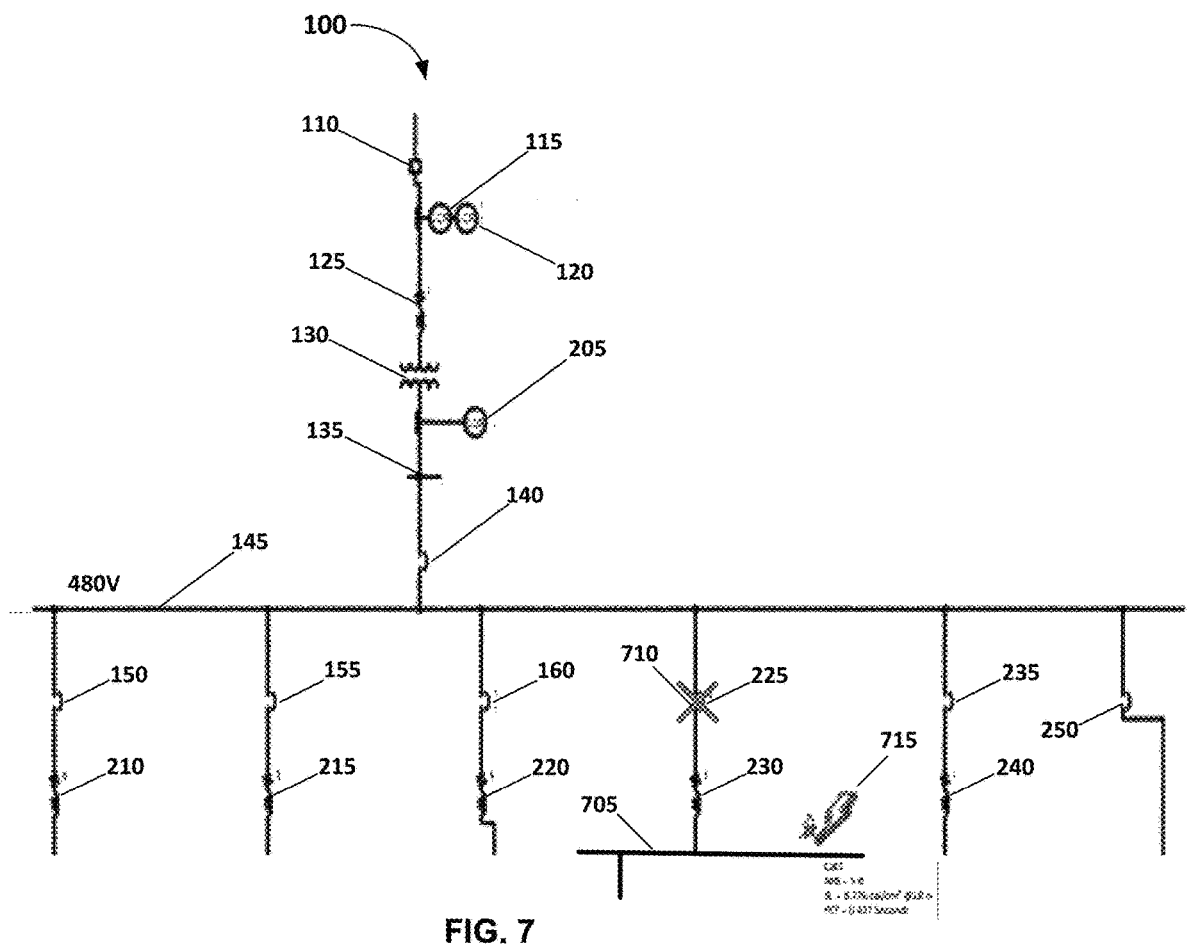
FIG. 7 is an illustration of an exemplary electrical system with coordination of 480 Volt feeder breaker and 480 Volt incomer breaker, in accordance with an embodiment of the present invention.

FIG. 7 is an illustration of an exemplary electrical system 100 with coordination of 480 Volt feeder breaker 225 and incomer breaker 140, in accordance with an embodiment of the present invention. 480 Volt feeder breaker 225 may trip first if any short circuit incident occurs on feeder bus 705 with the installation of the additional over current relay 205 close to the secondary side of 1500 kVA transformer 130. Cross 710 on breaker 225 is an indication that 480 Volt feeder breaker 225 will trip if there is any fault on 480 Volt bus 705. There is well coordination between 480 Volt feeder breaker 225 and 480 Volt incomer breaker 140. Fault sign 715 shows that 480 V bus 705 is faulted. The ETAP software may be utilized to develop whole existing electrical system then fault sign 715 indicator may be selected from the software. Fault sign 715 indicator may be put on bus 705 manually from the develop electrical system in the software which make bus 705 fault so that the ETAP software may simulate which protection equipment will trip first by indicating cross 710 on 480 Volt feeder breaker 225 (primary protection of bus 705) to isolate from the electrical system. Breaker 225 may trip first if there is any fault on bus 705.

Figure 8:
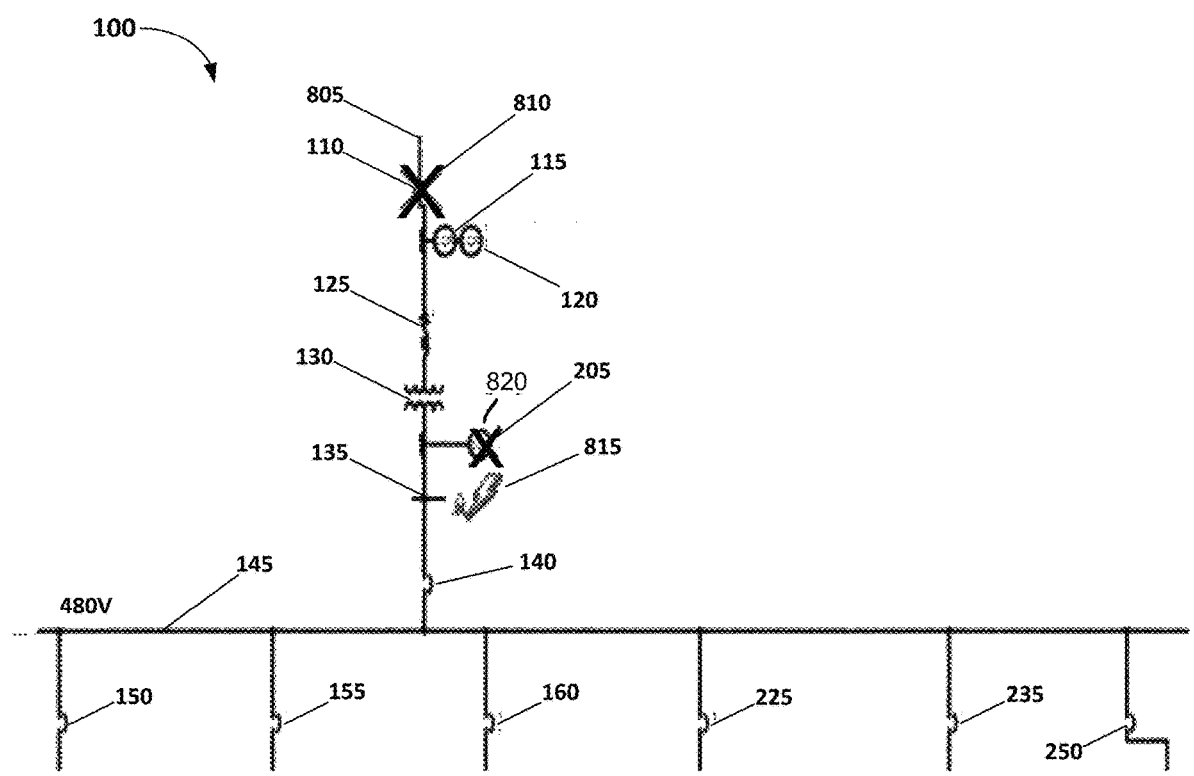
FIG. 8 is an illustration of an exemplary electrical system with coordination of 480 Volt incomer breaker and transformer upstream relay without installation of new overcurrent relay in between the secondary side (480 Volt) of the transformer and line side of the 480 Volt incomer breaker, in accordance with an embodiment of the present invention.

FIG. 8 is an illustration of an exemplary electrical system 100 with coordination of 480 Volt incomer breaker 140 and transformer upstream relay 115 without additional relay 205 on secondary side of transformer 130, in accordance with an embodiment of the present invention. In one embodiment, upstream relay 115 which protects 1500 kVA transformer 130 usually trips 4160 Volt breaker 110 if any short circuit incident occurs on connection point 135 of secondary side (480 Volt) of transformer 130 and line side of the downstream 480 Volt incomer breaker 140. The fault clearing time may be more than 2 seconds and Arc Flash energy is 58.117 cal/cm2 on 135. Alternatively, the fault clearing time may be limited to 2 second maximum which may be supported by IEEE 1584. When the fault clearing time is very slow, the slow clearing time may cause the Arc Flash energy to reach very high levels. Cross 805 on breaker 110 is an indication that 4160 Volt breaker 110 will trip if there is any fault on the 480 Volt bus 135. There is well coordination between 4160 Volt breaker 110 and 480 Volt breaker 140 without overcurrent relay 205 (e.g., cross 820 indicates that relay 205 may not be installed) but fault clearing time is more than about 2 seconds. Fault sign 815 is an indication that the 480V bus 135 is faulted. ETAP software may be utilized to develop whole existing electrical system then fault sign 815 indicator may be selected from the software. Fault sign 815 indicator may be put on bus 135 manually from the develop electrical system in the software which make bus 135 fault so that the software may simulate which protection equipment will trip first by indicating cross 810 on breaker 110 (primary protection of bus 135 without installation of 205) to isolate from electrical system.

Figure 9:
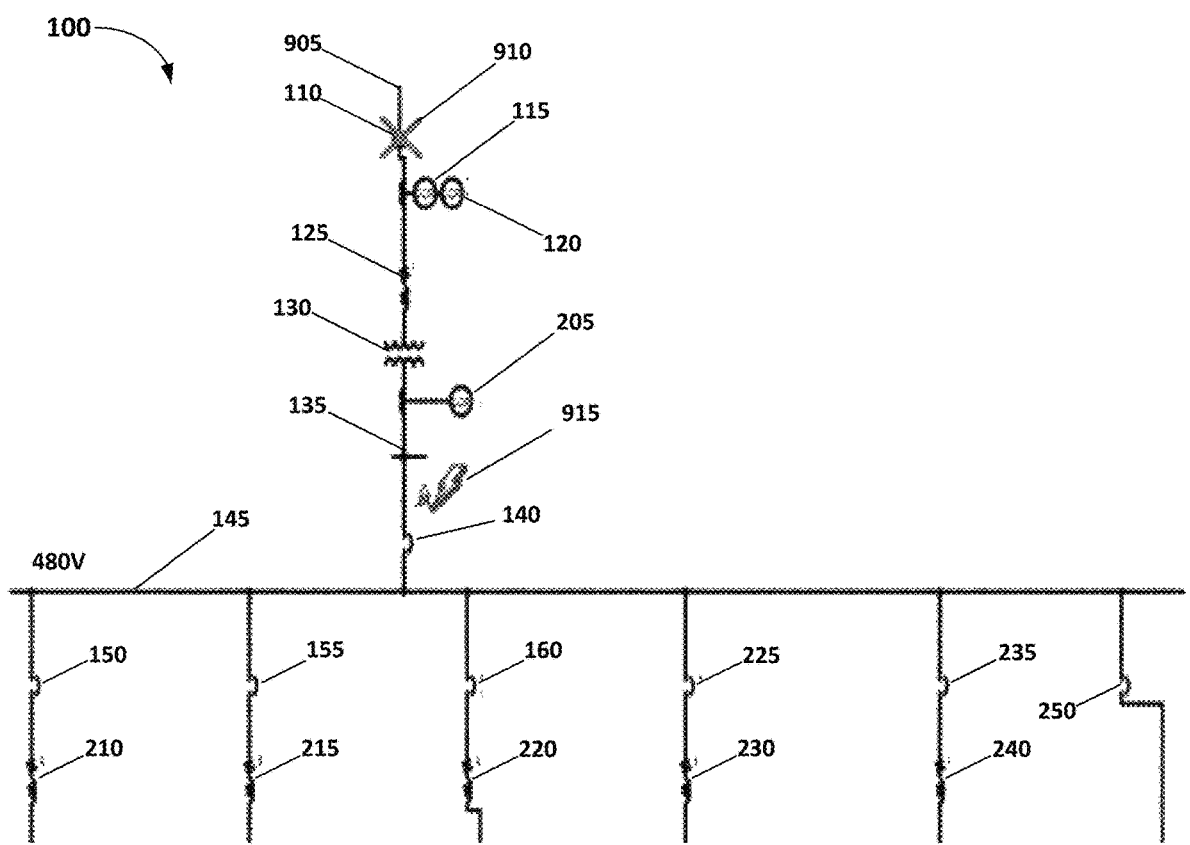
FIG. 9 is an illustration of an exemplary electrical system with coordination of 480 Volt incomer breaker and transformer upstream relay, in accordance with an embodiment of the present invention.

FIG. 9 is an illustration of an exemplary electrical system 100 with coordination of 480 Volt incomer breaker 140 and transformer upstream relay 115 with additional relay 205 on the secondary side of the 1500 kVA transformer, in accordance with an embodiment of the present invention. In one embodiment, with proper coordination, over current relay (Stn Svc 6B Over current R) 205 may trip 1500 kVA transformer upstream breaker 110 if any short circuit incident occurs on the connection point 135 of secondary side of transformer 130 and line side of the downstream 480 Volt breaker 140. The fault clearing may be very fast which is about 0.583 seconds that helps to reduce the Arc Flash energy level to 17.166 cal/cm2. Cross 910 on breaker 110 is an indicator that 4160 Volt breaker 110 will open if there is any fault on the 480 Volt bus 135. So, there is well coordination between 4160 Volt breaker 110 and 480 Volt breaker 140. Fault sign 915 is an indicator that the 480V bus 135 is faulted with fault clearing time of approximately 0.633 second. ETAP software may be utilized to develop whole existing electrical system then fault sign 915 indicator may be selected from the software. Fault sign 915 indicator may be put on bus 135 manually from the develop electrical system in the software which make bus 135 fault so that software may simulate which protection equipment will trip first by indicating cross 910 on breaker 110 (primary protection of bus 135 without installation of 205) to isolate from electrical system.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that may be carried out on a computing machine, a typical computer system may, when appropriately configured or designed, serve as a computer system in which those aspects of the invention may be embodied. Thus, the present invention is not limited to any particular tangible means of implementation.

All the features disclosed in this specification, including any accompanying abstract and drawings, may be replaced by alternative features serving the same, equivalent, or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" or "steps for" claim limitation implies that the broadest initial search on 35 USC § 112(6) (post AIA 112(f)) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC §

112(6) (post AIA 112(f)) when such corresponding structures are not explicitly disclosed in the foregoing patent specification. Therefore, for any invention element(s)/structure(s) corresponding to functional claim limitation(s), in the below claims interpreted under 35 USC § 112(6) (post AIA 112(f)), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claim's construction proceedings and/or examination of patent allowability properly identify and incorporate only the portions of each of these documents discovered during the broadest interpretation search of 35 USC § 112(6) (post AIA 112(f)) limitation, which exist in at least one of the patents and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112(6) (post AIA 112(f)), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing arc flash energy reduction systems according to the present invention will be apparent to those skilled in the art. Various aspects of the invention have been described above by way of illustration, and the specific embodiments disclosed are not intended to limit the invention to the particular forms disclosed. The particular implementation of the arc flash energy reduction system may vary depending upon the particular context or application. By way of example, and not limitation, the arc flash energy reduction system described in the foregoing were principally directed to reduction of arc flash energy implementations when performing work on electrical systems; however, similar techniques may instead be applied to electrical system such as using light sensor and current sensor which basically and operation of current and light of the Arc while there is Arc Flash. This technique cannot be used for old switchgear where there is no separation in between cubicles of the switchgear and also breaking down of the fiber optical cable is a big issue, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

Only those claims which employ the words "means for" or "steps for" are to be interpreted under 35 USC 112, sixth paragraph (pre-AIA) or 35 USC 112(f) post-AIA. Otherwise, no limitations from the specification are to be read into any claims, unless those limitations are expressly included in the claims.

What is claimed is:

1. A method for reducing arc flash energy on an electrical system to safe limits, the method comprising:
    installing an over current relay on a secondary side of a transformer on the electrical system;
    wherein the transformer having a primary side and the secondary side;
    pre-setting a time delay with instantaneous settings in the over current relay to a predetermined value;
    wherein the predetermined value is configured to be operable for coordinating at least one or more upstream relay(s) and at least one or more downstream breaker(s); and
    adjusting the time delay with instantaneous settings to a predetermined value based on a location of the current relay along the electrical system.

2. The method of claim 1, in which the transformer comprises a high voltage transformer, wherein the overcurrent relay may be wired from Current Transformers (CTs) via CT shorting terminals and be installed on a 480 Volt switchgear.

3. The method of claim 2, wherein the transformer comprises a proximate 13.8 kV/0.48 kV transformer.

4. The method of claim 2, wherein the transformer comprises a proximate 4.16 kV/0.48 kV transformer.

5. The method of claim 1, wherein the transformer secondary side comprises a proximate 480 Volts bus.

6. The method of claim 1, in which the over current relay comprises a time dial with instantaneous settings that is operable for adjusting the time delay of the current relay.

7. The method of claim 1, further comprising connecting new current transformers (CTs) with new additional over current relay to breakers by wire that are configured to protect a connection point of the secondary side of the transformer and line side of the at least one or more downstream breaker(s).

8. The method of claim 1, further comprising indicating a fault along the electrical system.

9. The method of claim 1, further comprising calculating a time delay with instantaneous settings based on the location of the over current relay to the transformer.

10. The method of claim 1, further comprising wiring said at least one or more downstream breakers to the secondary side of the transformer.

11. The method of claim 10, further comprising determining or calculating the time delay.

12. A method comprising the steps of:
reducing an arc flash energy on an electrical system to safe limits;
installing an over current relay on a secondary side of a transformer on the electrical system;
wherein the transformer having a primary side and the secondary side,
pre-setting a time delay of the over current relay to a predetermined value;
wherein the predetermined value is configured to be operable for coordinating at one or more transformer upstream relay and at least one or more downstream breaker; and
calculating or determining the time delay based on the location of the current relay to the transformer.

13. The method of claim 12, wherein the at least one or more downstream breakers(s) comprise at least one or more 480 Volt breaker(s), and wherein the at least one or more transformer upstream relay(s) is configured to protect the transformer.

14. The method of claim 12, wherein the transformer comprises a proximate 13.8 kV/0.48 kV transformer.

15. The method of claim 12, wherein the transformer comprises a proximate 4.16 kV/0.48 kV transformer.

16. The method of claim 12, further comprising the steps of adjusting the time delay to a predetermined value based on a location of the current relay along the electrical system.

17. The method of claim 16, in which the current relay comprises a time dial that is operable for adjusting the time delay of the current relay.

18. The method of claim 16, further comprising the steps of installing at least three or more breakers that are configured to protect a downstream load.

19. The method of claim 18, further comprising the steps of indicating a fault along the electrical system.

20. A system comprising:
means for reducing an arc flash energy on an electrical system to safe limits;
means for alleviating over current on a proximately 480 Volts secondary side of a transformer on the electrical system;
wherein the transformer having a primary side and the secondary side;
means for pre-setting a time delay of said means for reducing an arc flash energy to a predetermined value;
means for coordinating at least one or more transformer upstream relay and at least one or more downstream proximately 480 Volts breaker(s);
means for calculating or determining the time delay based on the location of the current relay to the transformer;
means for adjusting the time delay with instantaneous settings to a predetermined value based on a location of the current relay along the electrical system; and
means for indicating a fault along the electrical system.

* * * * *